(12) United States Patent
Kim et al.

(10) Patent No.: US 11,138,326 B2
(45) Date of Patent: Oct. 5, 2021

(54) INTERNET OF THINGS TERMINAL AND METHOD OF FILTERING CONTENT INCLUDING PRIVACY INFORMATION IN THE SAME

(71) Applicant: ELECTRONICS AND TELECOMMUNICATIONS RESEARCH INSTITUTE, Daejeon (KR)

(72) Inventors: Mal Hee Kim, Daejeon (KR); Nae Soo Kim, Daejeon (KR); Cheol Sig Pyo, Sejong-si (KR); Yong Geun Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 317 days.

(21) Appl. No.: 16/273,483

(22) Filed: Feb. 12, 2019

(65) Prior Publication Data

US 2020/0233969 A1 Jul. 23, 2020

(51) Int. Cl.
*G06F 21/62* (2013.01)
*H04L 29/06* (2006.01)

(52) U.S. Cl.
CPC ...... *G06F 21/6209* (2013.01); *H04L 63/0471* (2013.01); *H04L 63/0853* (2013.01)

(58) Field of Classification Search
CPC .......................... G06F 21/6209; H04L 63/0471
USPC ....................................................... 713/165
See application file for complete search history.

(56) References Cited

U.S. PATENT DOCUMENTS

| 2012/0166610 | A1 | 6/2012 | Doh et al. |
| 2015/0134954 | A1* | 5/2015 | Walley ............... H04W 12/069 713/168 |
| 2016/0292440 | A1 | 10/2016 | Batchu et al. |
| 2017/0054614 | A1 | 2/2017 | Carter et al. |
| 2017/0257367 | A1 | 9/2017 | Han et al. |
| 2017/0329963 | A1 | 11/2017 | Zhai et al. |
| 2018/0121671 | A1 | 5/2018 | Bhandari et al. |

FOREIGN PATENT DOCUMENTS

| KR | 10-2016-0071993 A | 6/2016 |
| KR | 10-2017-0133465 A | 12/2017 |
| KR | 10-2018-0046787 A | 5/2018 |

* cited by examiner

*Primary Examiner* — Anthony D Brown
(74) *Attorney, Agent, or Firm* — LRK Patent Law Firm

(57) ABSTRACT

A method of filtering content including privacy information in an Internet of things (IoT) terminal includes generating, by the processor, content management data prescribing a mapping relationship between pieces of content, a kind of a network, and a plurality of applications and storing the content management data in a content management data storage unit, based on a user input, the content management data prescribing a security policy associated with external transmission of the pieces of content, and when an external transmission request message corresponding to specific content of the pieces of content is received from the specific application, determining, by the processor, whether to allow external transmission of the specific content in response to the external transmission request message, based on the security policy prescribed in the content management data.

13 Claims, 6 Drawing Sheets

INTERNET OF THINGS TERMINAL AND METHOD OF FILTERING CONTENT INCLUDING PRIVACY INFORMATION IN THE SAME

CROSS-REFERENCE TO RELATED APPLICATION(S)

This application claims priority under 35 U.S.C. § 119 to Korean Patent Application No. 10-2019-0007049, filed on Jan. 18, 2019, the disclosure of which is incorporated herein by reference in its entirety.

BACKGROUND

1. Field of the Invention

The present invention relates to technology for filtering significant content including privacy information Internet of things (IoT).

2. Description of Related Art

General IoT terminals provide a function of collecting, generating, managing, and transmitting various information through various embedded sensors, a user input, an operation of a terminal application, and an interaction with another external IoT terminal (or an external server). Fundamentally, an operation of collecting, generating, managing, and transmitting information is performed by an application installed in IoT terminals. The application may be, for example, an application installed in a smartphone.

Internal driving of the application is executed based on an operation mechanism of the application instead of control by a user. In a case where a service is provided as a cloud service, data of each IoT terminal is transmitted to an external service server (a cloud server) and is used in the service server, and an additional service relevant thereto is provided.

A related art operating method has two security problems. One of the two security problems is a problem where there is a limitation in controlling, by a user, an operation mechanism of an application, and the other is a problem where information such as photograph data or sensing information collected by an IoT terminal is transmitted to an external service server, and then, security management of corresponding data is performed based on a policy of a corresponding service server. That is, in a case where a user needs a corresponding service, security of user data is mainly dependent on a security policy of a service server.

To describe a first problem in detail, a photograph processing application is assumed as being installed in an IoT terminal. The photograph processing application may access photograph data generated by a camera application. That is, a specific application may access data generated by another application. When a user selects a photograph through the photograph processing application and requests desired modification, an IoT terminal transmits a photograph to an external application server and simultaneously transfers a request. The external application server modifies a corresponding photograph according to the request and again transmits a modified photograph to the IoT terminal. For example, it is visually supposed that the photograph processing application transmits only a photograph selected by a user, but if other photographs are transmitted together, the user can respond to a corresponding case. Particularly, in a case where the photograph processing application intellectually recognizes photographs (for example, a passport photograph, a passbook photograph, etc.) and transmits the recognized photographs to the outside in a state where the user is unaware of the transmission of the recognized photographs, the user cannot recognize the transmission of the recognized photographs, and moreover, cannot control the transmission of the recognized photographs.

To describe a second problem in detail, it is assumed that a user is provided with a health monitoring service or an object recognition service. Biometric information about the user, information about eating habits, information (for example, clothes, drugs, and information about appliance products connected to the IoT terminal) about personal property, and/or environment information (for example, in a smart home, operating states of in-house devices, an energy use state, a breakdown state, manufacturers, etc.) about the user among pieces of information collected and generated by an IoT terminal are/is transmitted to the external service server as-is in order for the user to get a desired service. When such information is leaked, privacy information about a user is directly or indirectly leaked, a privacy problem occurs. In this case, corresponding information is pre-processed by an IoT terminal, and then, pre-processed information should be transmitted to the outside in a state where there is no problem in security. This is because, in a case where collected data is transmitted as-is, a user does not have authority to control a subsequent operation of processing the data.

In an application (for example, a finance-related application) which uses a service-based terminal and an inter-server security channel, management of security data used by the application is mainly dependent on an operation mechanism of the application.

An IoT terminal of a user unskilled in device manipulation provides an environment where an arbitrary application is easily installed unlike an intention of the user. Even in a case where the application transmits information stored in the IoT terminal to the outside, there is a limitation in recognition and control by the user. Therefore, in security management of data stored in an IoT terminal, a security method which enables a user of the IoT terminal to autonomously define and perform the security management is needed.

SUMMARY

Accordingly, the present invention provides an IoT terminal and a method of filtering content including privacy information in the same, which filter external transmission of information (privacy information) requiring security among pieces of information stored in the IoT terminal at an IoT terminal level (a user level) to enable a user of the IoT terminal to autonomously define and perform the security management of data stored in the IoT terminal.

In one general aspect, a method of filtering content, requested by a specific application in an Internet of things (IoT) terminal including a storage unit storing pieces of content, a processor executing a plurality of applications, and a communication unit transmitting, to an external device, the content requested by the specific application among the pieces of content according to control by the processor, includes generating, by the processor, content management data prescribing a mapping relationship between the pieces of content, a kind of a network, and the plurality of applications and storing the content management data in a content management data storage unit, based on a user input, the content management data prescribing a security policy associated with external transmission of the pieces of content, and when an external transmission request message corresponding to specific content of the pieces of content is received from the specific application, determining, by the processor, whether to allow external transmission of the specific content in response to the external transmission request message, based on the security policy prescribed in the content management data.

In another general aspect, an Internet of things (IoT) terminal includes a content storage unit configured to store pieces of content, a processor configured to execute a plurality of applications and previously generate content management data prescribing a mapping relationship between the pieces of content, a kind of a network, and the plurality of applications according to a user input, the content management data prescribing a security policy associated with external transmission of the pieces of content, a content management data storage unit configured to store the content management data, and a communication unit configured to transmit, to an external device, content requested by a specific application among the pieces of content according to control by the processor, wherein the processor receives an external transmission request message corresponding to specific content of the pieces of content from the specific application and determines whether to allow external transmission of the specific content in response to the external transmission request message, based on the security policy prescribed in the content management data.

Other features and aspects will be apparent from the following detailed description, the drawings, and the claims.

DETAILED DESCRIPTION OF EMBODIMENTS

Figure 1:
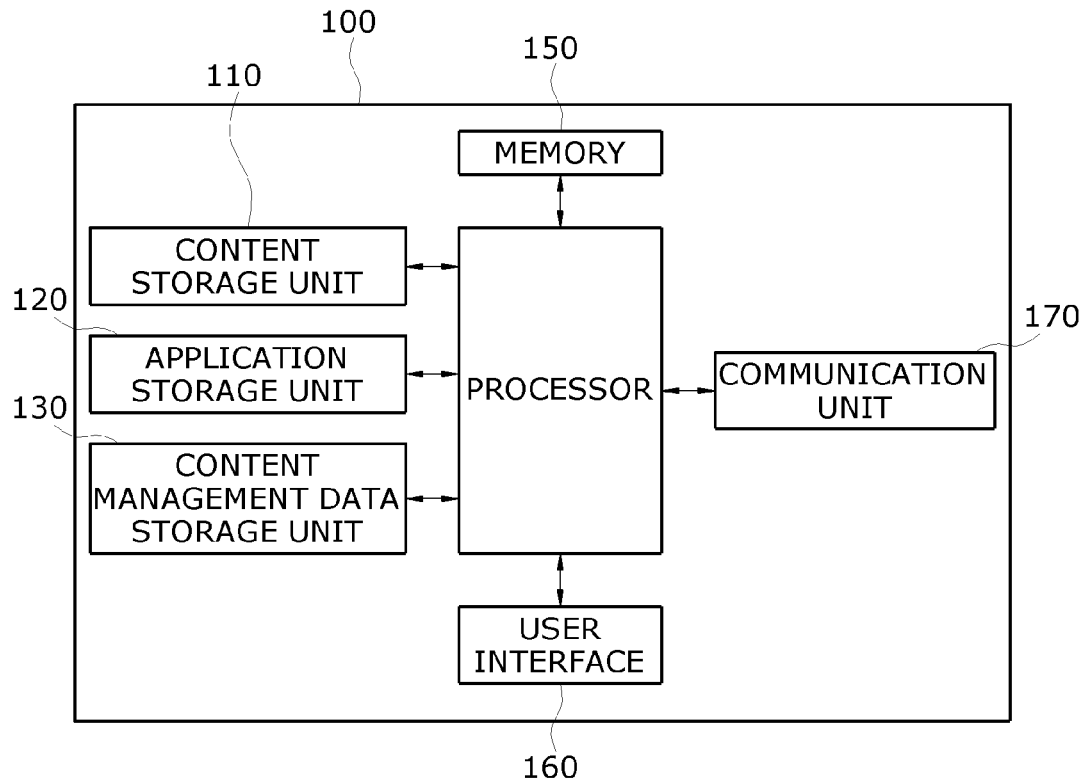
FIG. 1 is a block diagram schematically illustrating an internal configuration of an IoT terminal according to an embodiment of the present invention.

Hereinafter, example embodiments of the present invention will be described in detail with reference to the accompanying drawings. Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In various embodiments of the disclosure, the meaning of 'comprise', 'include', or 'have' specifies a property, a region, a fixed number, a step, a process, an element and/or a component but does not exclude other properties, regions, fixed numbers, steps, processes, elements and/or components.

As used herein, the term "or" includes any and all combinations of one or more of the associated listed items. For example, "A or B" may include A, include B, or include A and B.

It will be understood that, although the terms first, second, etc. used herein may qualify various elements according to various embodiments, these elements should not be limited by these terms. For example, the terms do not limit the order and/or importance of corresponding elements. These terms are only used to distinguish one element from another. For example, a first user equipment and a second user equipment are user equipment and denote different user equipment. For example, a first element may be referred to as a second element without departing from the spirit and scope of the present invention, and similarly, the second element may also be referred to as the first element.

In the case in which a component is referred to as being "connected" or "accessed" to other component, it should be understood that not only the component is directly connected or accessed to the other component, but also there may exist another component between the components. Meanwhile, in the case in which a component is referred to as being "directly connected" or "directly accessed" to other component, it should be understood that there is no component therebetween.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an electronic device according to various embodiments will be described with reference to the accompanying drawings. A user which is used in various embodiments may be referred to as a person using an electronic device or a device (for example, an artificial intelligence (AI) electronic device) using the electronic device.

FIG. 1 is a block diagram schematically illustrating an internal configuration of an IoT terminal 100 according to an embodiment of the present invention.

Referring to FIG. 1, the IoT terminal 100 according to an embodiment of the present invention may be an electronic device which provides an IoT service by using a wireless/wired communication function. The electronic device may be, for example, at least one of a sensor, an actuator, a smartphone, a tablet personal computer (PC), a mobile phone, a desktop PC, a laptop PC, a netbook PC, a personal digital assistant (PDA), a portable multimedia player (PMP), an MP3 player, a mobile medical device, a camera, a wearable device (e.g., a head-mounted device (HMD) such as electronic glasses, an electronic appcessory, or a smart watch), a gateway, a router, and a server.

In the IoT terminal 100 according to an embodiment of the present invention, instead of an application installed therein, a user may have authority to external transmit pieces of information stored therein. Therefore, an unauthorized application installed in the IoT terminal 100 may be prevented from transmitting the pieces of information stored in the IoT terminal 100 to the outside.

To this end, as illustrated in FIG. 1, the IoT terminal 100 may include a content storage unit 110, an application storage unit 120, a content management data storage unit 130, a processor 140, a memory 150, a user interface 160, and a communication unit 170.

Content Storage Unit 110

The content storage unit 110 may store pieces of content collected and generated by using a function of the IoT terminal 100. Also, the content storage unit 110 may store pieces of content collected from an external IoT terminal 100 or server by using a communication function of the IoT terminal 100.

The pieces of content may include, for example, an authentication certificate, a user memo, a photograph, a schedule, and sensing data collected through a sensing function of the IoT terminal 100, but the present embodiment is not limited thereto. In other embodiments, the pieces of content may include all data generated by the IoT terminal 100.

In terms of hardware, the content storage unit 110 may be a storage device which continuously maintains information stored therein even when power is not supplied thereto. Such a storage device may use a hard disk drive (HDD)m a non-volatile memory, or the like. Examples of the non-volatile memory may include read only memory (ROM), programmable read only memory (PROM), erasable programmable read only memory (EPROM), electrical erasable programmable read only memory (EEPROM), flash memory, etc.

Application Storage Unit 120

The application storage unit 120 may store a plurality of applications which use functions of the IoT terminal 100. The applications may include an operating system (OS) of the IoT terminal 100 and all application programs executed by the OS. An application may be simply referred to as an App.

The applications may include, for example, an App associated with an authentication certificate, an App associated with a memo pad, an App associated with a photograph, and an App associated with sensing data.

Similarly to the content storage unit 110, the application storage unit 120 may be a storage device which continuously maintains information stored therein even when power is not supplied thereto.

Content Management Data Storage Unit 130

The content management data storage unit 130 may store a content management policy previously set based on a user input.

Content management data may be data prescribing a security policy which groups and manages pieces of content stored in the content storage unit 110, based on a user setting.

Figure 2:
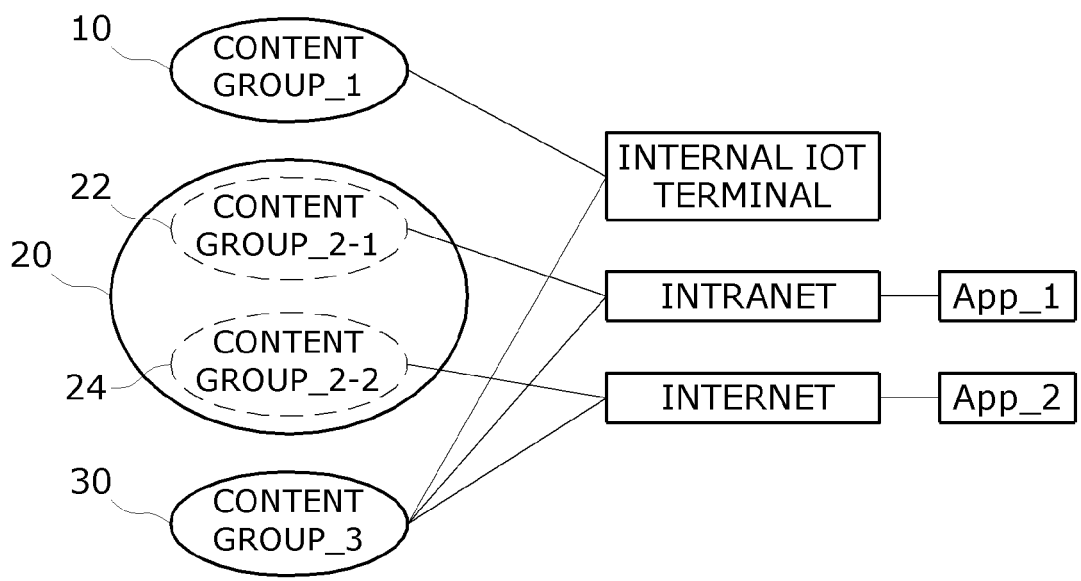
FIG. 2 is a diagram schematically illustrating a security policy which groups and manages pieces of content allowing external transmission and pieces of content disallowing external transmission on the basis of content management data, according to an embodiment of the present invention.

FIG. 2 is a diagram schematically illustrating a security policy which groups and manages pieces of content allowing external transmission and pieces of content disallowing external transmission on the basis of content management data, according to an embodiment of the present invention.

Referring to FIG. 2, pieces of content stored in the content storage unit 110 may be grouped into a first content group 10, a second content group 20, and a third content group 30, based on the security policy of the content management data.

The first content group 10 may include pieces of content used in only the IoT terminal 100 among the pieces of content stored in the content storage unit 110, based on the security policy of the content management data. That is, the first content group 10 may include only pieces of content which are not allowed to be transmitted to the outside. The pieces of content included in the first content group 10 may include, for example, a user memo where information requiring security like an identifier (ID) and a password of a user is recorded, a passport photograph, a certificate, and body pulse information.

The second content group 20 may include only pieces of content, which are allowed to be transmitted to the outside, among the pieces of content stored in the content storage unit 110, based on the security policy of the content management data. The pieces of content included in the second content group 20 may each be content where information exchange with an external device is needed in a limited physical region and a limited logical region, and for example, may each be content associated with a domain such as a smart home, smart health, and smart energy.

The second content group 20 may be subdivided based on the kind of a network which accesses the IoT terminal 100 in a case where the IoT terminal 100 exchanges information with an external device. For example, the second content group 20 may be subdivided into a content group 22 including pieces of content exchanged with an external device through an intranet and a content group 22 including pieces of content exchanged with an external device through the intranet.

The third content group 30 may include pieces of content which are used in the IoT terminal 100, based on the security policy of the content management data and are capable of being transmitted to the outside regardless of the kind of a network.

A group setting based on the security policy of the content management data may be performed based on security significance of corresponding content. Security significance of the pieces of content included in the first content group 10 may be highest, and security significance of the pieces of content included in the third content group 30 may be lowest.

As described above, content management data prescribing the security policy may be a mapping table which defines a mapping relationship between the kind of a network and a content group each used when transmitting each group and content included in each group to the outside.

Additionally, the content management data prescribing the security policy may define a mapping relationship between the kind of a network (for example, the intranet or Internet) and an application. That is, in a case where an application transmits content to an external device, the content management data prescribing the security policy may prescribe a security policy which sets the intranet or Internet over which the content is to be transmitted. Authority of an application to transmit specific content to the outside may be defined based on the mapping relationship between the kind of a network and an application.

As described above, the content management data prescribing the security policy may define a mapping relationship between pieces of content, the kind of a network, and an application by which the pieces of content are to be transmitted to the outside, thereby fundamentally preventing content from being transmitted to the outside by an application.

Figure 3:
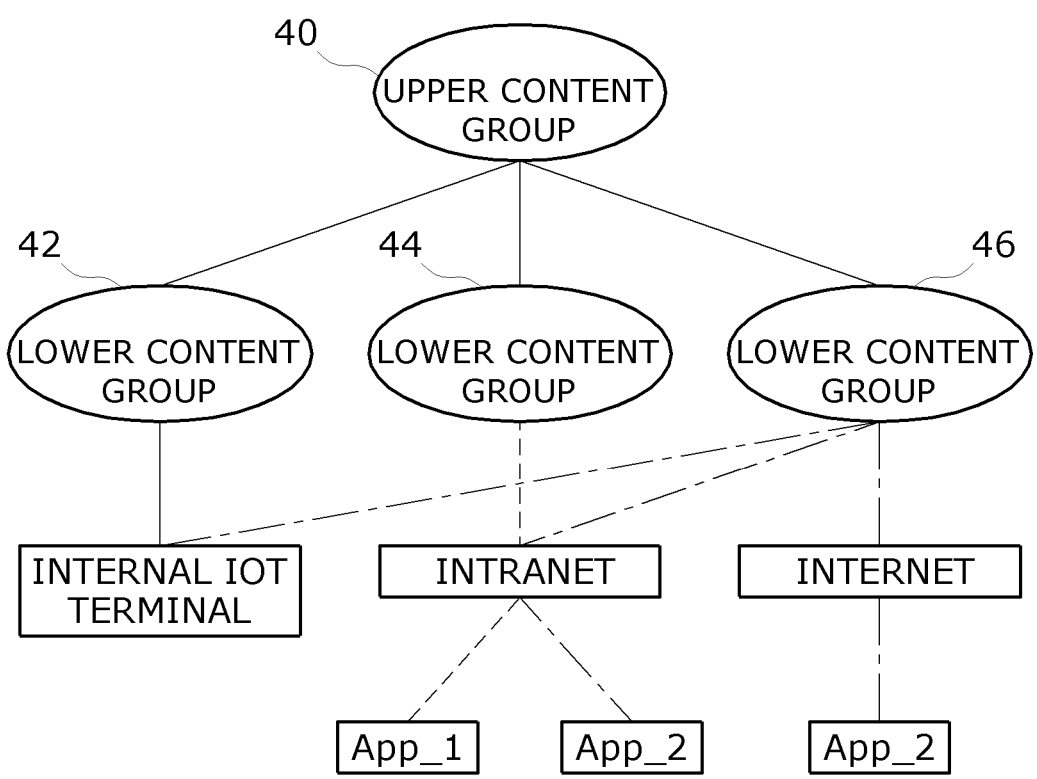
FIG. 3 is a diagram schematically illustrating a security policy which groups and manages pieces of content allowing external transmission and pieces of content disallowing external transmission on the basis of content management data, according to another embodiment of the present invention.

FIG. 3 is a diagram schematically illustrating a security policy which groups and manages pieces of content allowing external transmission and pieces of content disallowing external transmission on the basis of content management data, according to another embodiment of the present invention.

Referring to FIG. 3, in a security policy of content management data according to another embodiment of the present invention, pieces of content stored in the content storage unit 110 may be grouped into an upper content group 40 and a plurality of lower content groups 42, 44, 46, and 48 and managed.

Representative examples of pieces of content capable of being grouped into the upper content group 40 and the lower content groups 42, 44, 46, and 48 may include sensing data sensed by a sensor. In this case, content included in the upper group may be environment data, and pieces of content included in each of the lower groups may be temperature data, humidity data, and noxious gas concentration data.

Based on the security policy of the content management data according to another embodiment of the present invention, the lower content group 42 may include pieces of content used in only the IoT terminal 100, the lower content group 44 may include pieces of content exchanged with an external device through the intranet, and the lower content group 46 may include pieces of content exchanged with an external device through the intranet. Also, the lower content group 48 may include pieces of content which are used in the IoT terminal 100, based on the security policy of the content management data and are capable of being transmitted to the outside regardless of the kind of a network.

As described above, when a group setting mapped to the kind of a network is defined, a mapping relationship between applications App_1 to App_4 and the kind of a network may be defined. Based on a mapping relationship between the kind of a network and an application, authority of an application to transmit content included in a lower content group may be defined.

According to content management data which defines the mapping relationship illustrated in FIG. 3, a first application App_1 may have authority to externally transmit only the lower content group 44 mapped to the intranet, and a second application App_2 may have authority to externally transmit pieces of content mapped to the intranet among pieces of content included in the lower content group 46. Also, a third application App_3 may have authority to externally transmit only pieces of content mapped to the intranet among the pieces of content included in the lower content group 46.

Processor 140

The processor 140 may be an element for controlling and managing operations of the elements 110 to 170 included in the IoT terminal 100 and may be implemented by one or more general-use microprocessors, digital signal processors (DSPs), hardware codes, application specific integrated circuits (ASICs), field programmable gate arrays (FPGAs), or an arbitrary combination thereof.

The processor 140 may generate content management data according to a user input received through the user interface 160 and may perform a process of storing the content management data in the content management data storage unit 130.

In a case where the processor 140 executes an application stored in the application storage unit 120 and issues a request to externally transmit specific content from the executed application, the processor 140 may perform a process of determining whether to transmit the specific content to the outside, based on security policy defined in the content management data.

Based on the security policy defined in the content management data, when the specific content is allowed to be transmitted to the outside, the processor 140 may transfer, to the communication unit 170, a transmission command of content which is to be transmitted by the executed application and a message including the content received from the executed application. Therefore, the communication unit 170 may transmit the message including the content to an external device in response to the transmission command.

Memory 150

The memory 150 may be an element for providing an execution space of an application executed by the processor 140 and may be implemented as a volatile memory. The volatile memory may be, for example, random access memory (RAM).

User Interface 160

The user interface 160 may be an element for transferring a user input to the processor 140 and may be a key input device. The key input device may be, for example, a keyboard, a keypad, or a touch screen. The user input may include a command for generating content management data set by the user, a command for storing an application in the application storage unit 120, a command for storing content in the content storage unit 110, and a command for controlling a communication operation of the communication unit 170.

Communication Unit 170

The communication unit 170 may be an element for performing communication with an external device according to control by the processor 140 and may be configured to access the intranet and/or Internet. The communication unit 170 may include a modem, an amplifier, a filter, and a frequency conversion component, for supporting wireless/wired transmission and reception.

Figure 4:
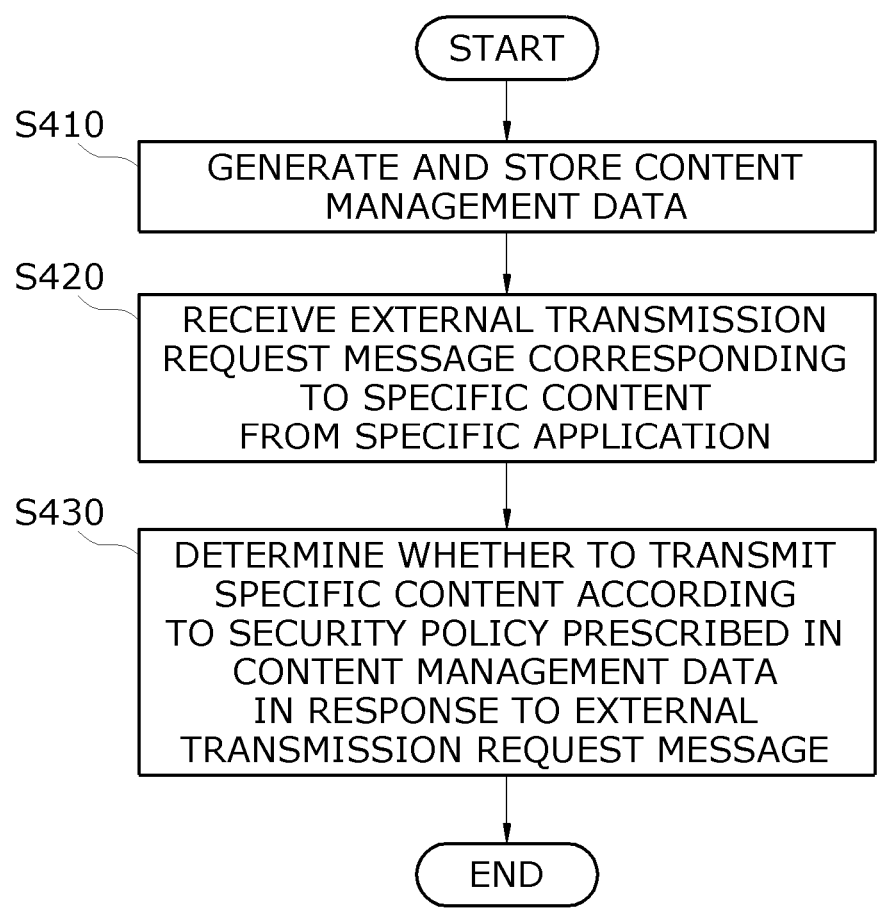
FIG. 4 is a flowchart illustrating a method of filtering personal information stored in an IoT terminal according to an embodiment of the present invention.

FIG. 4 is a flowchart illustrating a method of filtering personal information stored in an IoT terminal according to an embodiment of the present invention.

Referring to FIG. 4, first, in step S410, the processor 140 may perform a process of generating content management data which prescribes a security policy associated with external transmission of pieces of content stored in the content storage unit 110, based on a user input transferred through the user interface 160. Here, the content management data may be a mapping table representing a mapping relationship between the pieces of content, the kind of a network (for example, the intranet or Internet), and a plurality of applications. A process of generating content management data will be described in detail with reference to FIGS. 5 and 6.

Subsequently, in step S420, the processor 140 may perform a process of receiving an external transmission request message corresponding to specific content of the pieces of content from a specific application, executed by the processor 140, of a plurality of applications stored in the application storage unit 120.

Subsequently, in step S430, the processor 140 may perform a process of determining whether to transmit the specific content to the outside according to the security policy prescribed in the content management data in response to the external transmission request message.

Figure 5:
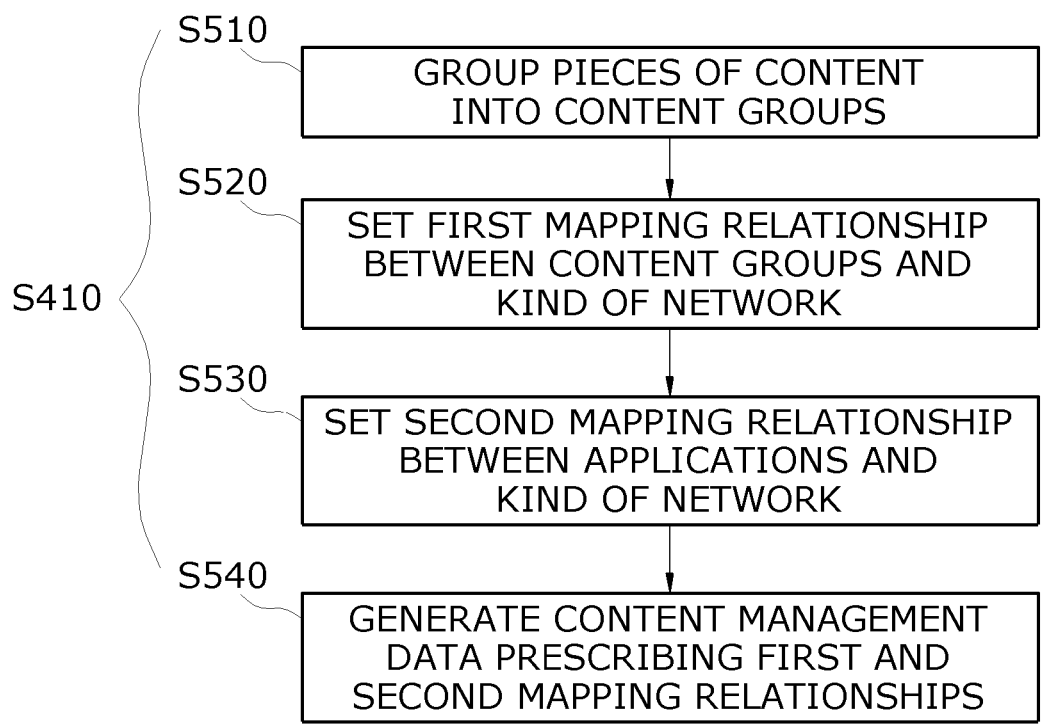
FIG. 5 is a flowchart illustrating an example of a detailed process of step S410 of FIG. 4.

FIG. 5 is a flowchart illustrating an example of a detailed process of step S410 of FIG. 4.

Referring to FIG. 5, in step S510, a process of grouping the pieces of content into a plurality of content groups may be performed. A grouping process may group, for example, the pieces of content into a first content group including pieces of content used in only the IoT terminal among the pieces of content, a second content group including only pieces of content which are allowed to be transmitted to the outside, and a third content group including pieces of content which are used in only the IoT terminal and are allowed to be transmitted to the outside. In this case, the second content group may include a $2\text{-}1^{th}$ content group including pieces of content which are set to be transmitted to the outside through the intranet corresponding to the kind of a network (the intranet and Internet) and a $2\text{-}2^{th}$ content group including pieces of content which are set to be transmitted to the outside through Internet corresponding to the kind of a network (the intranet and Internet). Security significance of the pieces of content included in the first content group 10 may be highest, and security significance of the pieces of content included in the third content group 30 may be lowest.

Subsequently, in step S520, a process of setting a first mapping relationship between the plurality of content groups and the kind of the network according to a user input (or a user setting) may be performed.

Subsequently, in step S530, a process of setting a second mapping relationship between the plurality of applications and the kind of the network may be performed. Based on the second mapping relationship, authority of each application to transmit the plurality of content groups to the outside may be set.

Subsequently, in step S540, a process of generating the content management data prescribing the first and second mapping relationships may be performed.

Figure 6:
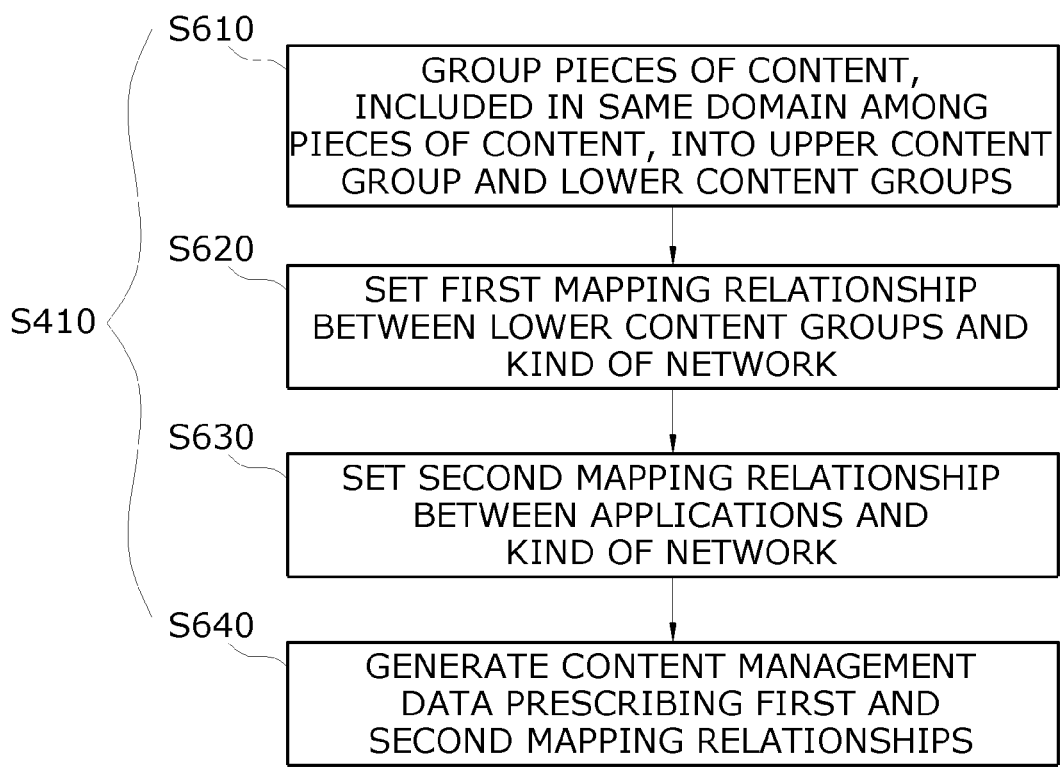
FIG. 6 is a flowchart illustrating another example of a detailed process of step S410 of FIG. 4.

FIG. 6 is a flowchart illustrating another example of a detailed process of step S410 of FIG. 4.

Referring to FIG. 6, in step S610, a process of grouping pieces of content, included in the same domain among the pieces of content, into an upper content group and a plurality of lower content groups may be performed.

Subsequently, in step S620, a process of setting a first mapping relationship between the plurality of lower content groups and the kind of the network may be performed.

Subsequently, in step S630, a process of setting a second mapping relationship between the plurality of applications and the kind of the network may be performed.

Subsequently, in step S640, a process of generating the content management data prescribing the first and second mapping relationships may be performed.

Figure 7:
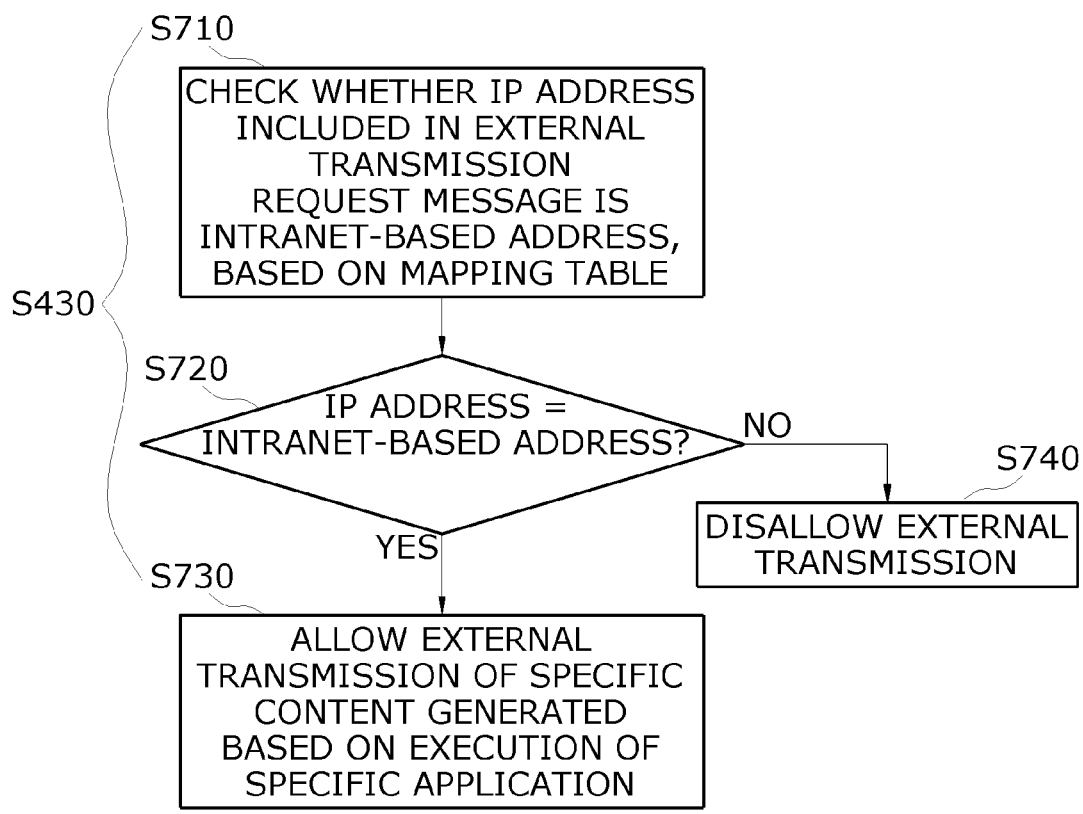
FIG. 7 is a flowchart illustrating a detailed process of step S430 of FIG. 4.

FIG. 7 is a flowchart illustrating a detailed process of step S410 of FIG. 4.

Referring to FIG. 7, first, it may be assumed that a user autonomously defines and manages a mapping table in order for specific content generated based on execution of a specific application to be transmitted to the outside at only an intranet-based address.

Based on such an assumption, in step S710, a process of checking whether an Internet protocol (IP) address included in the external transmission request message generated based on execution of the specific application is an intranet-based address, based on the mapping table, may be performed. That is, step S710 may be a process of checking an allowable transmission range of the specific content in each of Internet and the intranet, based on the mapping table.

The intranet-based address may correspond to the following form of IP addresses, and Internet assigned numbers authority (IANA) may be an IPv4 address which has be reserved at a private IP address.

10.0.0 to 10.255.255.255
172.16.0.0 to 172.31.255.255
192.168.0,0 to 192.168.255.255

Moreover, 169.254.0.0 to 169.254.255.255 may be an address which is prescribed to be used as automatic private IP addressing (APIPA). In addition, 169.254.0.0 to 169.254.255.255 may include an IP address which is internally used.

Subsequently, when it is checked in step S720 that the IP address included in the external transmission request message is an intranet-based address, a process of allowing the specific content generated based on execution of the specific application to be transmitted may be performed in step S730. Subsequently, the processor 140 may transfer, to the communication unit 170, a transmission command along with a message which is generated by the specific application and includes the specific content, and the communication unit 170 may transmit the message to an external device having the IP address included in the external transmission request message according to the transmission command.

On the other hand, when it is checked in step S720 that the IP address included in the external transmission request message is not the intranet-based address, a process of disallowing external transmission of the specific content generated based on execution of the specific application may be performed in step S740.

As described above, according to the embodiments of the present invention, unlike the related art where an application installed in an IoT terminal has authority to transmit specific content, whether to transmit specific content may be determined based on a security policy prescribed in content management data which is set according to a user setting, and thus, the user (or an IoT terminal) may have authority to transmit the specific content. Accordingly, external transmission of content undesired by the user may be fundamentally prevented.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of filtering content requested by a specific application in an Internet of things (IoT) terminal including a storage unit storing pieces of content, a processor executing a plurality of applications, and a communication unit transmitting, to an external device, the content requested by the specific application among the pieces of content according to control by the processor, the method comprising:

generating, by the processor, content management data prescribing a mapping relationship between the pieces of content, a kind of a network, and the plurality of applications and storing the content management data in a content management data storage unit, based on a user input, the content management data prescribing a security policy associated with external transmission of the pieces of content; and when an external transmission request message corresponding to specific content of the pieces of content is received from the specific application, determining, by the processor, whether to allow external transmission of the specific content in response to the external transmission request message, based on the security policy prescribed in the content management data, wherein the storing comprises:

grouping the pieces of content into a plurality of content groups;

setting a first mapping relationship between the plurality of content groups and the kind of the network;

setting a second mapping relationship between the kind of the network and the plurality of applications; and generating the content management data prescribing the first and second mapping relationships.

2. The method of claim 1, wherein transmission authority of each of the plurality of applications corresponding to the pieces of content groups is set based on the second mapping relationship.

3. The method of claim 1, wherein the grouping comprises grouping the pieces of content into a first content group including pieces of content used in the IoT terminal, a second content group including pieces of content which are allowed to be transmitted to the outside, and a third content group including pieces of content which are used in the IoT terminal and are allowed to be transmitted to the outside.

4. The method of claim 3, wherein the second content group comprises a $2\text{-}1^{th}$ content group including pieces of content which are set to be transmitted to the outside through an intranet corresponding to the kind of the network and a $2\text{-}2^{th}$ content group including pieces of content which are set to be transmitted to the outside through Internet corresponding to the kind of the network.

5. The method of claim 3, wherein security significance of the pieces of content included in the first content group is highest, and security significance of the pieces of content included in the third content group is lowest.

6. The method of claim 1, wherein the storing comprises:

grouping pieces of content, included in the same domain among the pieces of content, into an upper content group and a plurality of lower content groups;

setting a first mapping relationship between the plurality of lower content groups and the kind of the network;

setting a second mapping relationship between the plurality of applications and the kind of the network; and generating the content management data prescribing the first and second mapping relationships.

7. The method of claim 1, wherein the storing comprises:

checking whether an Internet protocol (IP) address included in the external transmission request message generated based on execution of the specific application is an IP address having a mapping relationship with specific content generated based on execution of the specific application, based on the security policy prescribed in the content management data; and when it is checked that the IP address included in the external transmission request message is the IP address having the mapping relationship with the specific content, allowing external transmission of the specific content generated based on execution of the specific application.

8. An Internet of things (IoT) terminal comprising:

a content storage unit configured to store pieces of content;

a processor configured to execute a plurality of applications and previously generate content management data prescribing a mapping relationship between the pieces of content, a kind of a network, and the plurality of applications according to a user input, the content management data prescribing a security policy associated with external transmission of the pieces of content;

a content management data storage unit configured to store the content management data; and a communication unit configured to transmit, to an external device, content requested by a specific application among the pieces of content according to control by the processor, wherein the processor receives an external transmission request message corresponding to specific content of the pieces of content from the specific application and determines whether to allow external transmission of the specific content in response to the external transmission request message, based on the security policy prescribed in the content management data, wherein the processor groups the pieces of content into a plurality of content groups, sets a first mapping relationship between the plurality of content groups and the kind of the network, sets a second mapping relationship between the kind of the network and the plurality of applications, and generates the content management data prescribing the first and second mapping relationships.

9. The IoT terminal of claim 8, wherein the processor sets transmission authority of each of the plurality of applications corresponding to the pieces of content groups, based on the second mapping relationship.

10. The IoT terminal of claim 8, wherein the processor groups the pieces of content into a first content group including pieces of content used in the IoT terminal, a second content group including pieces of content which are allowed to be transmitted to the outside, and a third content group including pieces of content which are used in the IoT terminal and are allowed to be transmitted to the outside.

11. The IoT terminal of claim 10, wherein the second content group grouped by the processor comprises a $2\text{-}1^{th}$ content group including pieces of content which are set to be transmitted to the outside through an intranet corresponding to the kind of the network and a $2\text{-}2^{th}$ content group including pieces of content which are set to be transmitted to the outside through Internet corresponding to the kind of the network.

12. The IoT terminal of claim 8, wherein the processor groups pieces of content, included in the same domain among the pieces of content, into an upper content group and a plurality of lower content groups, sets a first mapping relationship between the plurality of lower content groups and the kind of the network, sets a second mapping relationship between the plurality of applications and the kind of the network, and generates the content management data prescribing the first and second mapping relationships.

13. The IoT terminal of claim 8, wherein the processor checks whether an Internet protocol (IP) address included in the external transmission request message is an IP address having a mapping relationship with the specific application (specific content) and, when it is checked that the IP address included in the external transmission request message is the IP address having the mapping relationship, the processor allows external transmission of the specific content performed by the specific application.

\* \* \* \* \*